Jan. 18, 1944. P. F. ZIEGLER ET AL 2,339,446
CREPED PRESSURE-SENSITIVE ADHESIVE MATERIAL
Filed Aug. 2, 1940
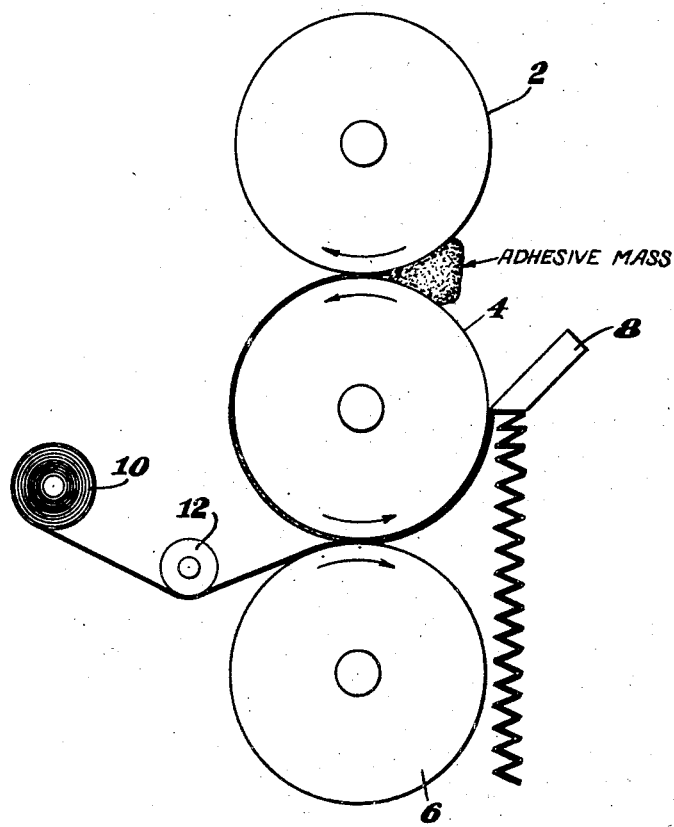
Inventors
Paul F. Ziegler
By Karl Cedric Hoeglund
H. L. Kirkpatrick
Attorney Patented Jan. 18, 1944

2,339,446

UNITED STATES PATENT OFFICE 2,339,446

CREPED PRESSURE-SENSITIVE ADHESIVE MATERIAL

Paul F. Ziegler, Winnetka, and Karl Cedric Hoeglund, Chicago, Ill., assignors to The Kendall Company, Boston, Mass., a corporation of Massachusetts Application August 2, 1940, Serial No. 349,972

3 Claims. (Cl. 154—43)

This invention relates to a creped, pressure-sensitive adhesive material, and particularly to a material of the type employed principally as masking tape, though it is also employed for various other useful purposes.

The typical commercial, pressure-sensitive adhesive material comprises a creped paper backing having an adhesive on one side thereof forming an applying medium for the material. Such products have certain definite features arising from the creped backing used, and from the intrinsic character of the adhesive. Thus, since the paper is creped before the adhesive is applied, the adhesive is co-extensive with an area less than the total area of the backing and, as the paper has certain overlappings as the result of the creping, the adhesive tends to attach the overlappings to each other, so that when the creped product is stretched, as the overlappings extend, particular strain is imposed upon the adhesive, causing either fracture of portions of the adhesive from the backing leaving such portions unattached, or even fracture of the adhesive itself leaving areas of backing actually exposed.

Also, because the typical commercial pressure-sensitive adhesive material includes a previously creped paper, it has been necessary to apply the pressure-sensitive adhesive in a non-viscous liquid form, so that, as it is applied, it will easily flow and cover the rugosities of the previously creped paper. In order that the adhesive may, after application, be brought to its essential plastic pressure-sensitive and normally tacky condition, application is made with a volatile solvent. Products so made are expensive because of the use of these solvents with their incident waste and danger if inflammable. Their use, furthermore, imparts to the product certain uncontrolled and undesired characteristics which are inherent in pressure-sensitive adhesives laid down with volatile solvents, both because of the action of the highly liquid and volatile solvent in wetting the backing on application, and because of action of the solvent on the adhesive itself.

The product of this invention is a creped material comprising a backing sheet combined with a sheet of pressed-on pressure-sensitive material as distinguished from a layer of solvent-laid adhesive, the two combined sheets having substantially co-extensive crepings, the adhesive material being applied as a pre-formed sheet having a relatively high elasticity and plasticity. In this product, the adhesive mass may comprise a completely overlying sheet which maintains its separate identity after the co-extensive creping of both to overcome the hereinbefore referred to overlapping difficulties of the type of product made heretofore with a paper creped before application of a volatile-solvent-laid liquid adhesive.

Another advantage of our pressed-on adhesive is that uniform thickness of the sheet on the tape is highly aided by control of the surface tension of the sheet of adhesive during application thereof to the backing. It is known that during evaporation of a volatile solvent, especially if rapid, the solution tends to accumulate itself into droplets and ridges, due to a state of non-equilibrium existing between the rapidly changing surface tension in various areas of the film. This action tends to produce a heavier deposit of solids at points where the solution has so accumulated. These variations in surface tensions occur during the evaporation of the solvent from a solvent-laid adhesive spread, especially when the evaporation of the solvent is rapid, as it usually is.

In our pressed-on sheet of plastic adhesive, the surface tension during application to the backing is uniform, thus avoiding the undesirable tendency of adhesive solids to distribute themselves irregularly, which tendency is present as previously described, when uncontrolled variations and discrepancies in surface tensions are involved.

Also, the thickness of the adhesive sheet in our product is in no way limited by the necessary low viscosity of the solvent dispersed adhesive.

The character of the adhesive in our product also affords a new type of interface for the product between the backing and the adhesive sheet, due to the overlying nature of such adhesive sheet. This interface is characterized by a predominance of what is known in the art as "specific adhesion," as distinguished from the predominating penetrating type of adhesion intrinsic in solvent-laid adhesives. This results in the provision of an adhesive layer equally attached to each unit of backing, and of uniform thickness, avoiding the non-uniform thickness, and irregularities of adhesion after extension, due to overlappings present in a product employing a previously creped backing. Furthermore, the adhesive does not affect the physical characteristics of the backing, that is, the adhesive sheet is not solvent-laid and does not penetrate, permeate, or impregnate the backing even on the interface portion adjacent the adhesive.

For both of these reasons, commercially desirable thin sheets of pressure-sensitive material may be provided in our product with economy in spread—a given amount of adhesive solids covering more area, with a larger proportion of the adhesive plastically available for application of the product.

In addition, the interface is a factor in the conformability in use of the product. As is evident, merging or intermingling of the adhesive sheet and backing, such as ensues from penetration of an adhesive into a backing, decreases the pliability of the backing. In a solvent-laid adhesive, the interface has tentacle-like adhesive portions permeating the backing, such portions being formed as a result of the comparatively ready flow of the adhesive dispersed in the solvent or other liquid carrier as it wets the backing; and, in the case of some backings, such as cloth, a penetration into the fibers themselves; in either case, with resulting uncontrollable effects upon the pliability of the backing. In our product, the flexural quality of the backing can be retained, unaffected by penetration of the adhesive sheet.

Such independence of the backing and adhesive sheet affords numerous advantages. The backing may be chosen without regard to limitations imposed by the action of a solvent, and the adhesive sheet may be combined with backings or over coatings heretofore commercially impossible with the previous penetrating adhesives. In our product, thinner backings may be used, and such a backing does not require any special unifying treatment. The creping is performed after application of the adhesive, as will be hereinafter seen, when the adhesive sheet, however, is in an elastically relaxed condition, so that the adhesive sheet is made to conform to the paper in a plastic and preferably a thermoset condition, without structural distortion of the paper in creping, and it is unnecessary to provide the strong, and hence expensive papers of the previously creped product. Also, less homogeneous and even porous, perforate, or open-mesh backings may be used in our product, because of the non-penetrating characteristic of the interface.

In accordance with this invention, a preformed sheet of pressure-sensitive adhesive material may be formed from a cellulosic material such as cellulose acetate, cellulose propionate, cellulose formate, cellulose butyrate, or mixtures of such cellulose esters, or from benzyl cellulose or ethyl cellulose, or other cellulose ethers, suitably plasticized and treated, as by milling, to secure the desired viscous and plastic properties in the compound to permit formation of a sheet thereof, which can be subsequently applied, as a sheet, to a sheet backing, and then the combined laminated product creped as hereinafter set forth.

For instance, a cellulosic material such as cellulose acetate may be mixed with a resin, such as a condensation product of formaldehyde with aromatic sulfonamides (known commercially as Santolite M. H. P.), and a plasticizer, for example, a mixture of ortho and para toluene ethyl sulfonamides (commercially available as Santicizer 8), and brought to the proper consistency for spreading on flexible backings by a calendering operation on a rubber mill, and may be transferred directly from the mill to the top of a 3-roll calender.

As an example of proper milling operations for these ingredients, one part of cellulose acetate may be mixed with one part of Santicizer 8 and milled on a rubber mill at approximately 150° F. for fifteen minutes. Two parts of Santolite are preferably melted in four parts of Santicizer 8, and gradually added to the plasticized cellulose acetate on the mill. The temperature can be maintained at 150° F. while the first two thirds is being added, and then can be advantageously lowered to 120° F. for the remaining addition. This part of the mixing can be completed in about one and one-half hours. In order to remove the mass from the mill, the fast roll should be cooled to say 90° F., and the low roll heated to 150° F. The mass can then be removed by spading.

As a further example of milling preparation of an adhesive for use in the fabrication of the creped adhesive product of this invention, one part of granular benzyl cellulose may be stirred in a molten solution of three parts of hydrogenated methyl abietate and one and one-half parts of rosin. This compound may be then transferred to the mill rolls of the rubber calender at 150° F., for mastication, in accordance with the previous instructions.

When the plasticizer used for the cellulosic ingredient is a solid, the adhesive may be prepared by preliminarily breaking down the solid plasticizer on a heated mill and then adding the cellulosic ingredient.

Cellulosic materials thus compounded and treated possess pressure-sensitive adhesive qualities, and remain permanently tacky after application to sheet backings.

The figure in the drawing diagrammatically illustrates, in a general way, apparatus employed in application of this type of adhesive to a backing in practicing the preferred method of making the product of this invention.

Referring to the drawing, there is shown a 3-roll calender group, top, center and bottom rolls, numbered respectively, 2, 4 and 6, the center of said rolls having in contact therewith, as hereinafter more fully described, a doctor blade 8. There is also shown a roll 10 carrying the paper supply from which the paper is led around a roll 12 and between the center and bottom calender rolls 4 and 6. In this method of making the product, the pressure-sensitive cellulosic adhesive mass, which has already been plasticized, as by kneading or milling, is placed between the slightly spaced top and center calender rolls 2 and 4, where it may be further kneaded or milled to a definite temperature and then extruded or formed into a thin sheet of definite predetermined thickness. The precise spacing of the said rolls is regulated or adjusted in accordance with the thickness to which it is desired to sheet the adhesive material upon the center calender roll. The rolls 2 and 4 are both preferably heated, though to relatively different temperatures.

In the spreading of the adhesives previously described, the top roll may be heated to 150° F., ±10°, the center roll may be heated to 100° F., ±10°, and the bottom roll may be heated to 130° F., ±10°. By so heating the rolls, the relatively high temperature of the top roll serves not only to assist in maintaining the adhesive mass at an elevated temperature, but also prevents adherence of said mass to the top roll so that the mass becomes sheeted in a thin layer of uniform thickness and, once formed upon the moving surface of the center calender roll, thereafter maintains its integrity as a sheet and is carried downwardly towards where the paper backing is applied thereto. At the nip of the center and bottom rolls, there is led between the adhesive layer thus formed and the bottom roll, the strip of paper which, because of the pressure of the bottom roll thereagainst, is caused to tightly adhere to the sheet of adhesive material and continues with it about the moving middle roll to the doctor blade 8. This doctor is not only closely pressed against the roll, as is common in the art, but, in addition, preferably by a suitable electrical resistance unit (not shown) is heated to a somewhat elevated temperature, preferably 150 F., ±10°, to control and preferably maintain substantially constant the degree of resistance offered by the face of the doctor blade to the movement of the adhesive layer with its paper backing forced thereagainst. Thus the character and result of the operation is controlled not only by the temperature at which the adhesive mass is applied in sheeted form to the center roll, but by the maintenance of the desired temperature by the center roll unit the adhesive mass encounters the resistance of the heated doctor blade which, due to its temperature control, is substantially constant and provides a uniform knife or doctor resistance (for any given take-off angle) to the moving layer of adhesive. The doctor resistance is also affected by the angle (ordinarily 90°, ±20°) between the active surface thereof and the center roll, and this in turn affects the size of the crepe and number per inch of length of the paper. If it is desired to decrease the number of crepes per inch, this can be done by increasing the temperature of the doctor blade and without changing its angle; by increasing the temperature of the middle roll, or both. Conversely, if it is desired to increase the number it can be done by decreasing the temperature of the doctor; by decreasing that of the middle roll; or both. Also, crepe size may be varied by changing the take-off angle of the doctor. Naturally, the pull-off tension on the creped product should be kept low, just enough to insure removal so as to retain the maximum crepe as imparted to the paper.

The use of cellulosic adhesives of the type described in this application permits the use of backings which heretofore could not have been used with the conventional rubber pressure-sensitives, either because of lack of adhesion of rubber adhesives to the backing, or because of a high affinity of the rubber adhesive to the backing when the tape was wound upon itself, which high affinity prevented the tape from being unwound without leaving a residue of the adhesive on the backing.

For instance, if the cellulosic adhesive mass of this invention is contemplated, various types of rubber treated or rubber coated fabrics or papers may be utilized for the backings. Likewise, the cellulosic adhesive may be combined with backings or over coatings which have incorporated therein materials which are injured or affected by the penetrating type of adhesive during application. Thus it is possible to use combinations of adhesives and backings which would be mutually somewhat soluble in the same solvent, or to use the most economical backing, without regard to whether it would be attacked by the most economical solvent. In the case of the cellulosic pressure-sensitive adhesives of this invention, the field of available backings is substantially widened to include, in addition to paper and cloth, cellulosic backings of a non-fibrous nature, such as regenerated cellulose, ethyl cellulose, benzyl cellulose, cellulose acetate. In such cases it may be desirable to use as a plasticizer for the adhesive a plasticizer which is likewise compatible with the backing, or which is identical with the plasticizer used in the backing sheet. A firmer bond may thus result, although, in such cases, some precaution, perhaps in the nature of a backing coating, will be necessary to prevent attack of the backing by the active exposed surface of the adhesive which contacts the back of the tape in roll form.

In the foregoing specification the backing material, for convenience, is referred to simply as "paper," but it will be appreciated that any one of various other thin flexible backing may be employed and therefore the word "paper" is to be construed as covering other functionally equivalent backings.

This application is a continuation in part of our prior copending applications Serial Nos. 725,424 and 188,902 filed May 14, 1934, and February 5, 1938, respectively, and simultaneously issued into Patents Nos. 2,214,006 and 2,214,007, respectively, on September 10, 1940.

Having described our invention, what we wish to claim and secure by Letters Patents is:

1. As an article of manufacture, a pressure-sensitive adhesive tape comprising in combination, two preformed sheets, one of said sheets constituting a backing sheet having on one side thereof and pressure-united therewith the other of said sheets, said other sheet being a plastic sheet of pressure-sensitive material of substantially uniform thickness consisting essentially of a heat-plasticized milled compound including a material proportion of a cellulose ether, the sheets of combined structure having substantially co-extensive crepings.

2. As an article of manufacture, a pressure-sensitive adhesive tape comprising in combination, two preformed sheets, one of said sheets constituting a backing sheet having on one side thereof and pressure-united therewith the other of said sheets, said other sheet being a plastic sheet of pressure-sensitive material of substantially uniform thickness consisting essentially of a heat-plasticized milled compound including a cellulose derivative film-forming vehicle, a resin and a non-volatile plasticizer, the sheets of combined structure having substantially coextensive crepings.

3. As an article of manufacture, a pressure-sensitive adhesive tape comprising in combination, two preformed sheets, one of said sheets constituting a backing sheet having on one side thereof and pressure-united therewith the other of said sheets, said other sheet being a plastic sheet of pressure-sensitive material of substantially uniform thickness consisting esesntially of a heat plasticized milled compound including a cellulosic film-forming vehicle chosen from the group comprising cellulosic ethers and cellulosic esters, the sheets of combined structure having substantially coextensive crepings.

PAUL F. ZIEGLER.
KARL CEDRIC HOEGLUND.